Figure 1:
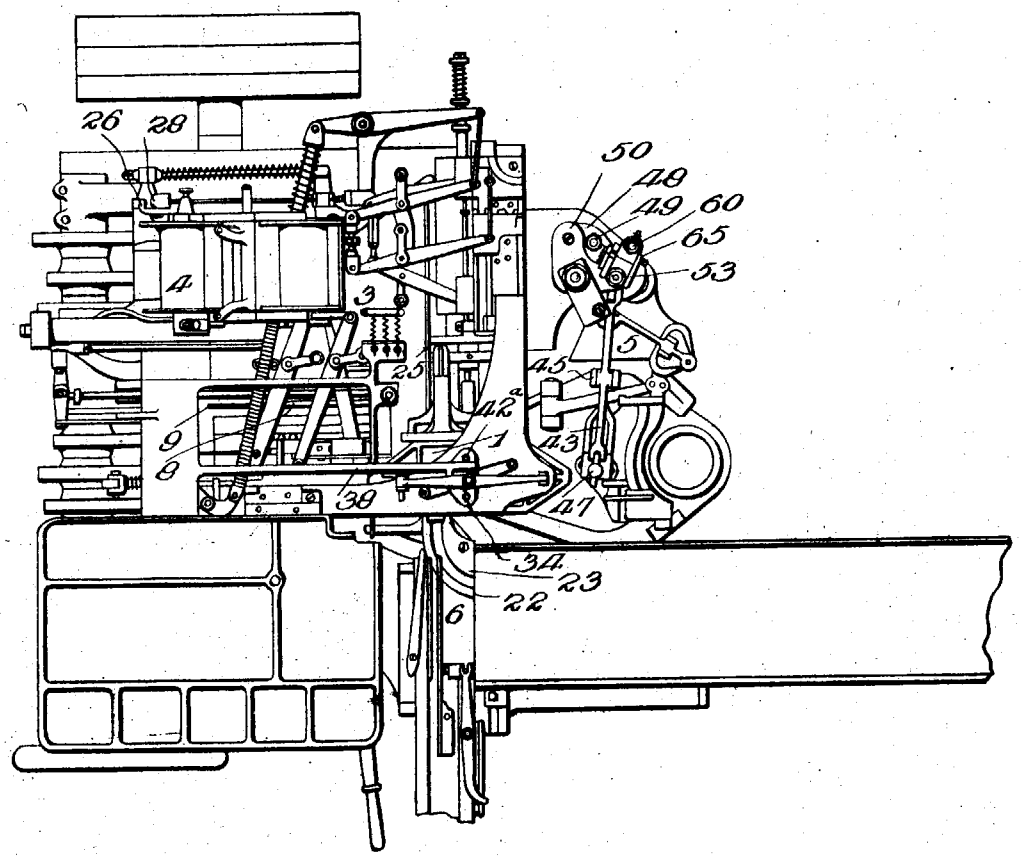

No. 12,819. REISSUED JUNE 23, 1908.

J. S. BANCROFT & M. C. INDAHL.

TYPE MACHINE.

APPLICATION FILED MAY 14, 1908.

6 SHEETS—SHEET 1.

Witnesses

Thomas Durant

Melville N. Church

Inventors

John Sellers Bancroft

Maintz C. Indahl

By Church & Church

Attorney

No. 12,819. REISSUED JUNE 23, 1908.

J. S. BANCROFT & M. C. INDAHL.

TYPE MACHINE.

APPLICATION FILED MAY 14, 1908.

6 SHEETS—SHEET 2.

Witnesses

Thomas Grant

Melville W. Church

Inventor

John Sellers Bancroft

Maurits C. Indahl

By Chas. F. Church

Attorney

No. 12,819. REISSUED JUNE 23, 1908.
J. S. BANCROFT & M. C. INDAHL.
TYPE MACHINE.
APPLICATION FILED MAY 14, 1908.
6 SHEETS—SHEET 3.
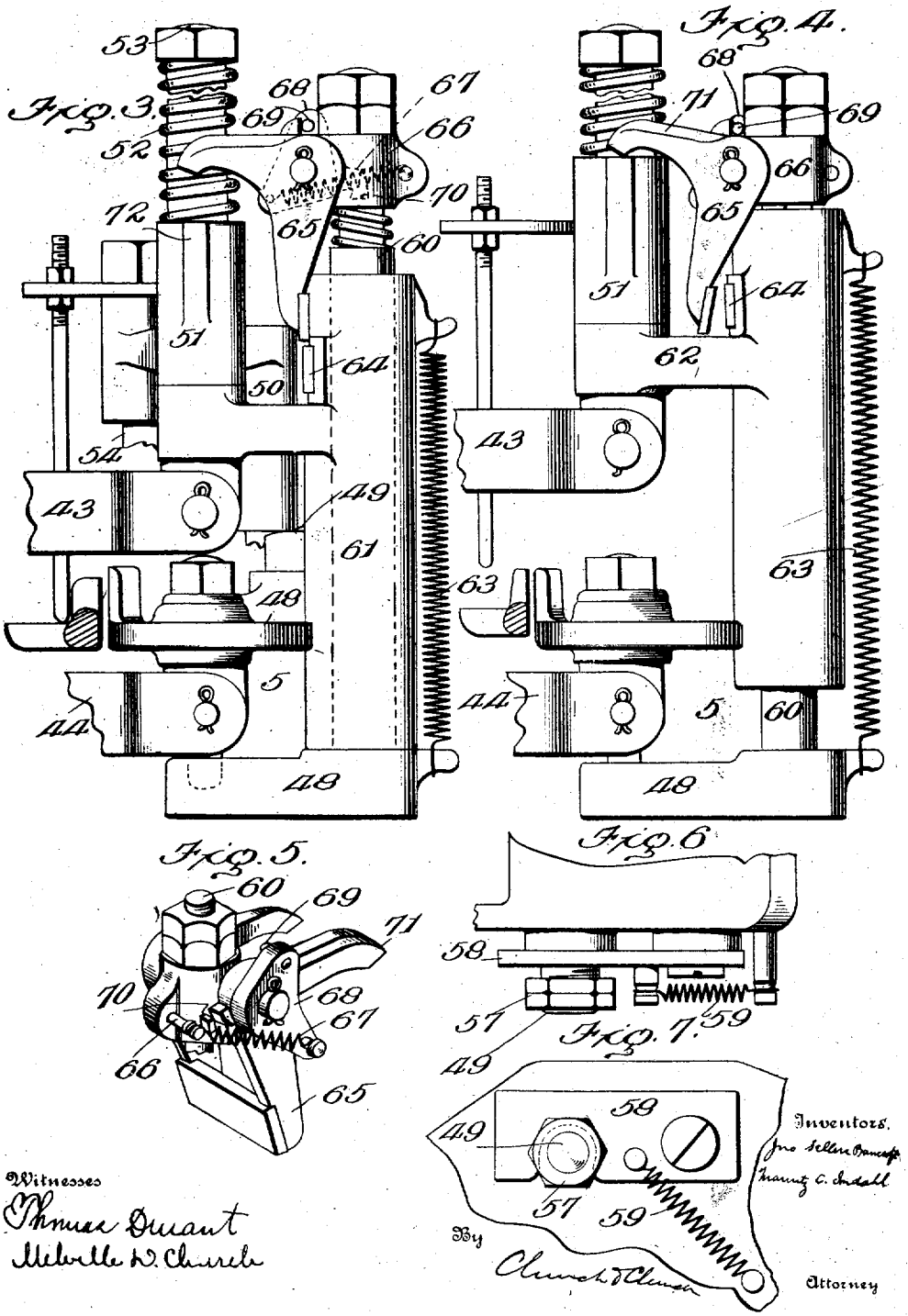
Witnesses
Thomas Durant
Melville W. Church
Inventors,
Jno Sellers Bancroft
Manning C. Indahl
By Church & Church
Attorney No. 12,819. REISSUED JUNE 23, 1908.
J. S. BANCROFT & M. C. INDAHL.
TYPE MACHINE.
APPLICATION FILED MAY 14, 1908.
6 SHEETS—SHEET 4.
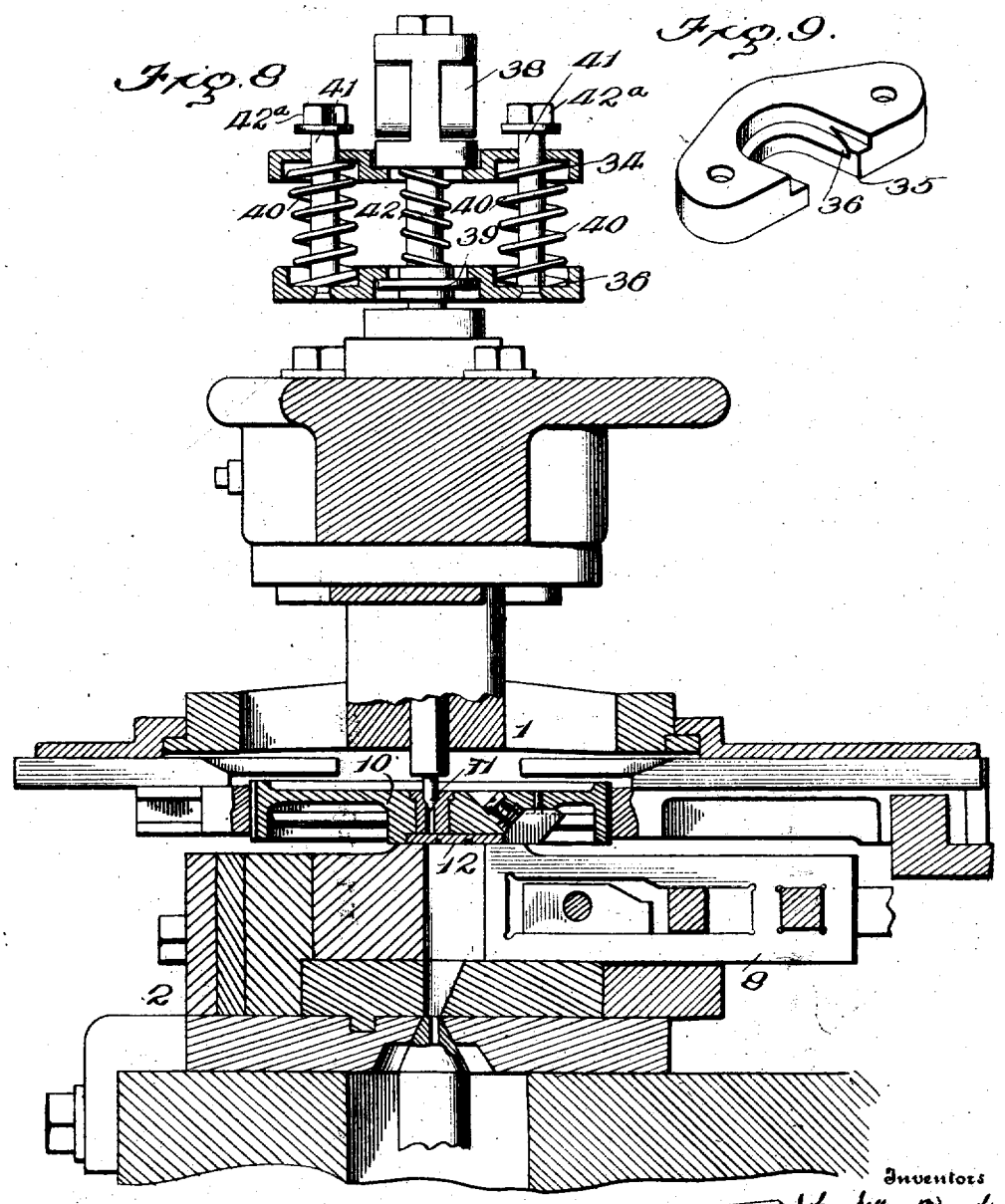
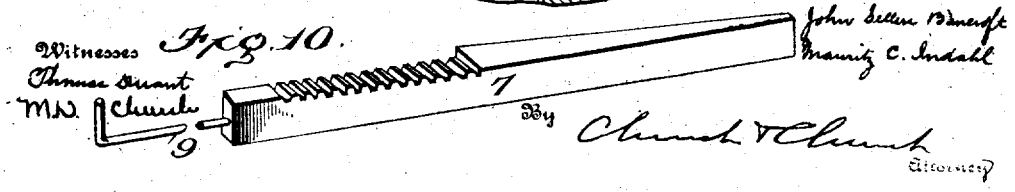
Witnesses
Thomas Grant
M.S. Church
Inventors
John Sellen Bancroft
Maurice C. Indahl
By Church & Church
Attorneys No. 12,819. REISSUED JUNE 23, 1908
J. S. BANCROFT & M. C. INDAHL.
TYPE MACHINE.
APPLICATION FILED MAY 14, 1908.
6 SHEETS—SHEET 5.
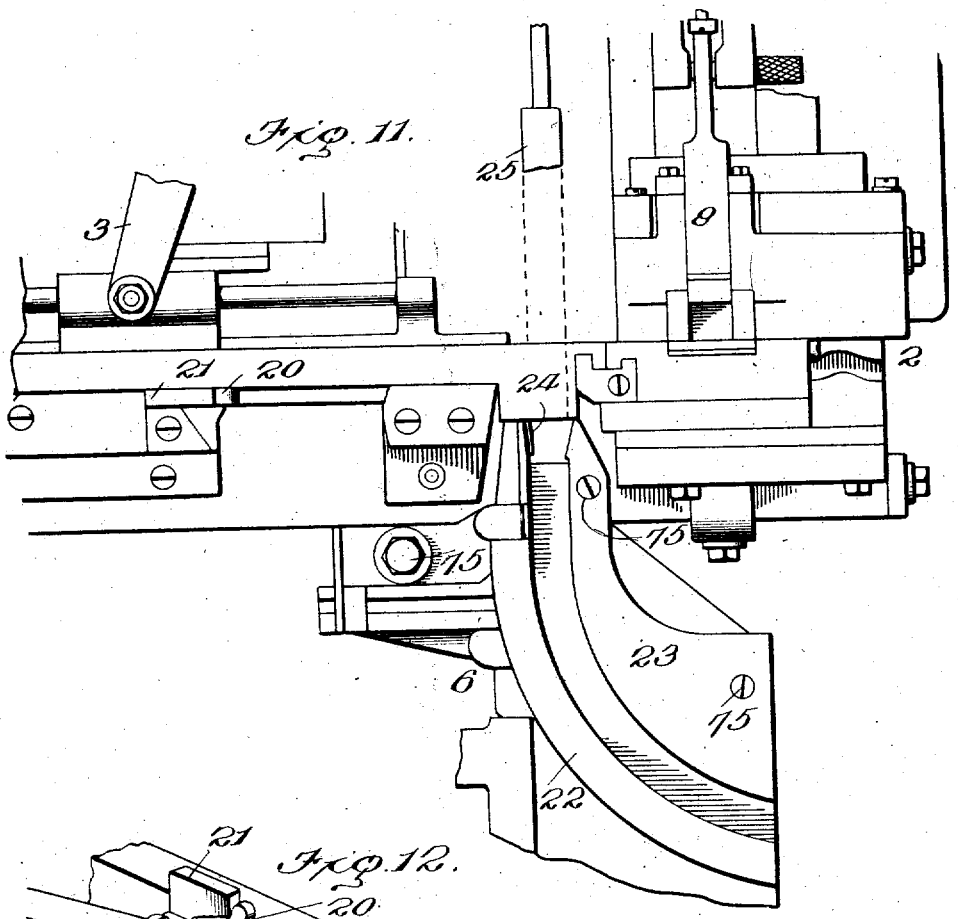
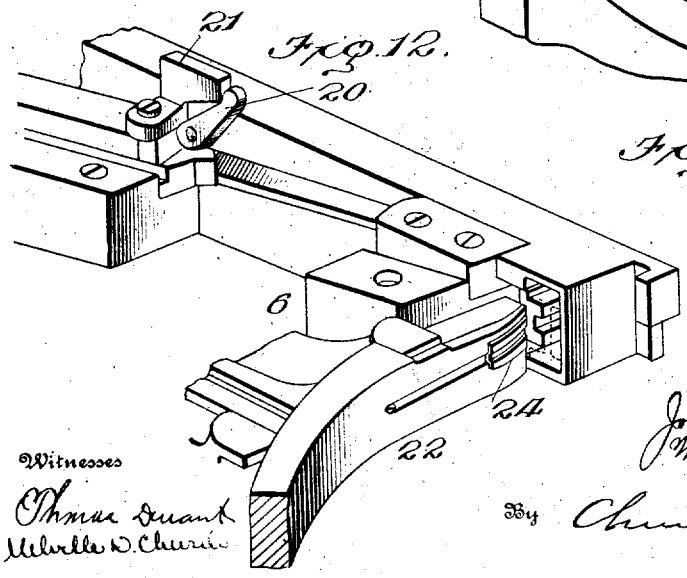
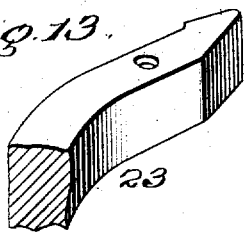
Witnesses
Thomas Durant
Melville D. Church
Inventors
John Sellers Bancroft
Maurits C. Indahl
By Church & Church
Attorney
NORRIS PETERS, INC., LITHO., WASHINGTON, D. C.

No. 12,819. REISSUED JUNE 23, 1908.

J. S. BANCROFT & M. C. INDAHL.

TYPE MACHINE.

APPLICATION FILED MAY 14, 1908.

6 SHEETS—SHEET 6.

Witnesses

Thomas Durant

Melville D. Church

Inventor

John Sellers Bancroft

Maurice C. Indahl

By Church & Church

Attorney

NORRIS PETERS, INC., LITHO., WASHINGTON, D. C.

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

TYPE-MACHINE.

No. 12,819. Specification of Reissued Letters Patent. Reissued June 23, 1908.

Original application filed December 1, 1904, Serial No. 235,126. Renewed November 8, 1905, Serial No. 286,366. Original No. 883,378, dated March 31, 1908. Application for reissue filed May 14, 1908. Serial No. 432,954.

*To all whom it may concern:*

Be it known that we, JOHN SELLERS BANCROFT and MAURITZ C. INDAHL, both citizens of the United States, residing at Philadelphia, in the county of Philadelphia and State of Pennsylvania, have invented certain new and useful Improvements in Type-Machines; and we do hereby declare the following to be a full, clear, and exact description of the same, reference being had to the accompanying drawings, forming a part of this specification, and to the figures and letters of reference marked thereon.

This invention relates to improvements in or upon what is known as the monotype casting machine, and it has for its principal object to enlarge its capacity in such degree that it may be utilized either as a composing machine, *i. e.*, for the production of type in the order of composition and the assembling of the same in justified lines, or as a sorts caster, *i. e.*, the production of head-line or display type of a size greatly in excess of the present capacity of the machine.

To this end the invention consists in supplying certain additions to the pump action, centering mechanism, type carrier and mold blade operating devices, and substitutes for the type carrying and delivering devices, the latter parts being interchangeable with corresponding elements of the composing machine,—all as hereinafter fully described, the novel features being pointed out in the claims.

Figure 2:
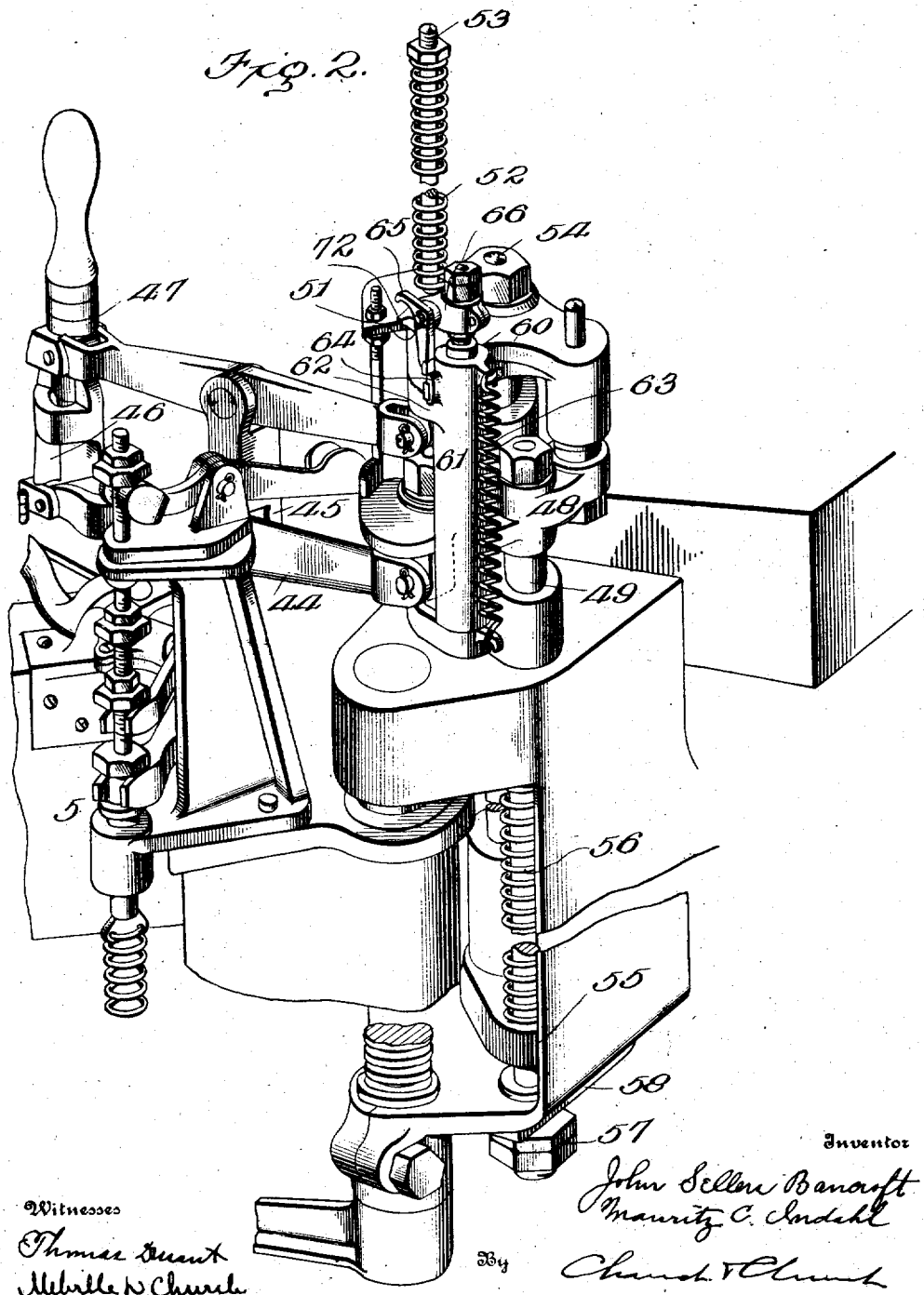
Figure 14:
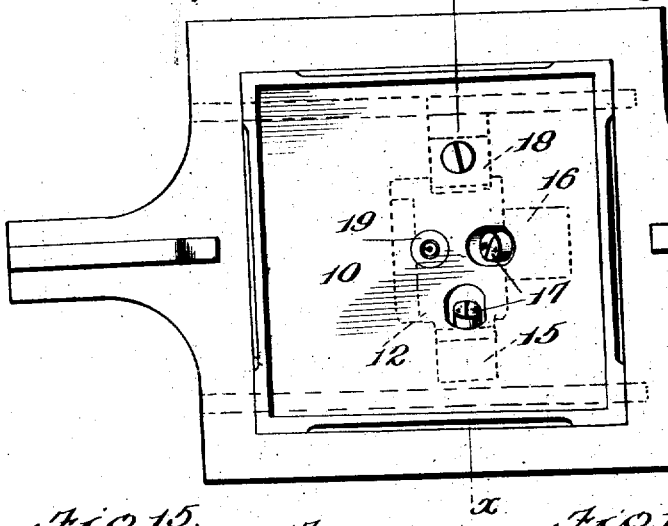
Figure 21:
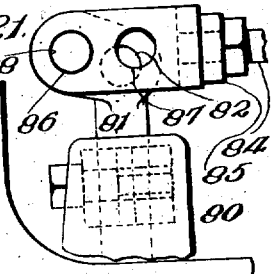
Figure 22:
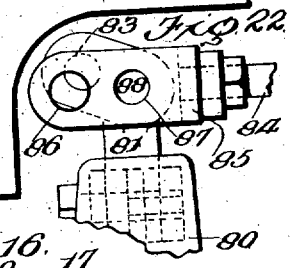
Figure 15:
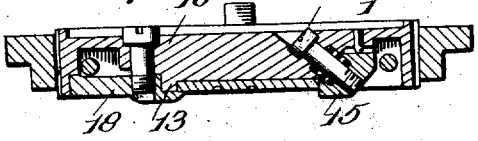
Figure 16:
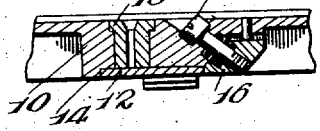
Figure 17:
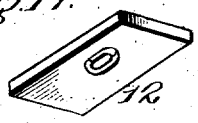
Figure 18:
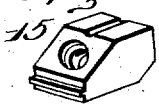
Figure 19:
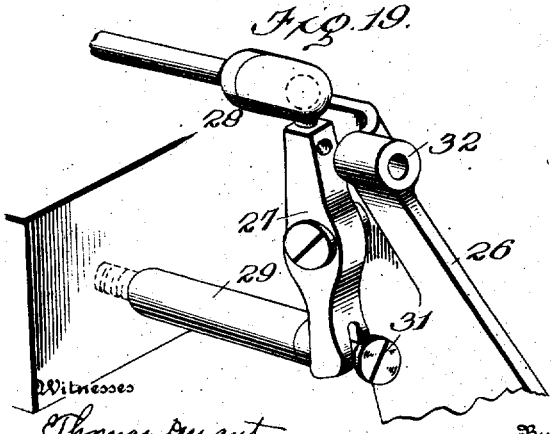
Figure 20:
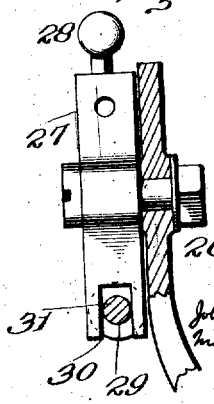

In the accompanying drawings illustrating a preferred form of embodiment, Figure 1 is a diagrammatic top view of the casting machine, as provided with the additions for converting it into a sorts caster. Fig. 2 is a perspective view of that portion of the pump actuating mechanism embracing the additions thereto. Figs. 3 and 4 are partial side elevations of the pump actuating mechanism showing the trip action in two positions. Fig. 5 is a perspective view of the trip. Fig. 6 is a side elevation, and Fig. 7 a bottom plan view of the check for limiting or positioning the pump body spring rod. Fig. 8 is a partial vertical sectional view of the mold and die-case showing the centering plunger and the auxiliary compression device. Fig. 9 is a perspective view of one of the heads for the auxiliary springs. Fig. 10 is a perspective view of the normal wedge for adjusting the mold blade. Fig. 11 is a top plan view of the mold, type carrier and galley race. Fig. 12 is a perspective view of the type carrier and one side of the galley race. Fig. 13 is a perspective of a portion of the other side of the galley race detached. Fig. 14 is a top plan view of the die-case and matrix holder. Fig. 15 is a section of the die-case and holder on line $x$—$x$, Fig. 14. Fig. 16 is a partial section through the matrix holder in a plane transverse to Fig. 15. Fig. 17 is a perspective view of the matrix. Fig. 18 is a perspective view of the clamping block. Fig. 19 is a perspective of the multiplying attachment for the mold-blade actuating lever. Fig. 20 is a detail partly in section of said multiplying attachment. Figs. 21 and 22 are side elevations of the shiftable type-carrier actuating connections showing the parts in two positions of adjustment.

Similar numerals designate like parts in the several figures.

The type casting and composing machine illustrated is in all essential particulars similar to that of Patent No. 625,998 plus the improvements of Patents Nos. 674,374; 674,375; 674,376; 700,290 and 752,814, to which reference may be had for the details of construction and mode of operation.

It will suffice for present purposes to designate some of the principal groups of mechanism, such as the die-case system 1 including die-case frame, carrier and centering plunger; the mold 2, with its movable mold blade and cross-block; the die-case centering mechanism 3, with its two sets of centering devices operating in transverse planes and controlled by stop pins; the paper feed 4 for the perforated controller; the metal injecting mechanism 5; and the galley mechanism 6.

The foregoing are constituent parts of the commercial casting and composing machine, but when the latter is equipped as a sorts caster the shifting of the die-case, the automatic adjustment of the mold-blade and the assembling action of the galley mechanism are not required, hence these motions are suspended by locking the paper feeding devices so as to maintain the record strip in position, and disconnecting the normal wedge from the centering mechanism so that it may be set or adjusted independently, to gage the mold irrespective of the position of the die-case.

The type which the sorts caster is designed to produce greatly exceeds in lateral dimensions the maximum capacity of the machine when used for composition, hence a mold 2 (Figs. 8 and 11) of larger capacity, but of the same general character is substituted for that of the composing machine (see Patent 752,814); the normal wedge 7 (Fig. 10) which controls the position of the mold blade 8, for dimensioning the body to correspond with the character is deprived of the projection for engaging the jaws of the centering mechanism, and, in lieu thereof, is provided with a rod or extension 9, (Fig. 10) to facilitate manual adjustment; and the series of matrix blocks are removed from the die-case and replaced therein or in a substitute therefor by a holder or block 10 (Figs. 14, 15 and 16) equipped with a centering cavity for the centering and holding plunger 11 and with means for detachably securing a matrix block or plate 12 to its lower surface facing the mold cavity. The matrix block 12 contains an impression of the character to be produced, justified with relation to two of its sides or edges, and the holder 10 is provided with shoulders 13, 14 at right angles, to receive said edges and serve as gages for positioning the matrix in proper relation to the centering plunger. Angular clamping blocks 15, 16, seated on the holder 10 and provided with diagonal adjusting screws 17, engage the edges of the matrix block opposite the gaging shoulders 13, 14, one of said blocks being provided with a lip overlapping the edge of the matrix block the opposite edge being in like manner engaged by an adjustable clamp 18, to retain said matrix block firmly in its seat on the holder. The centering cavity for plunger 11 is contained in a bearing 19 removably inserted in the upper face of holder 10 with the axis of its conical seat in such relation to gages 13, 14 that when said plunger is depressed, to finally center and clamp the matrix upon the open end of the mold, the character impression will be justified with relation to the side walls of said cavity. The capacity of the mold so far exceeds that used ordinarily for composition that the range of motion permitted the mold blade actuating devices is insufficient to compass the two extreme positions assigned the mold blade for maximum set ways dimension and for ejecting the type and delivering it to the carrier, hence an addition is made to said actuating devices whereby, by a simple adjustment or readjustment of parts, the motion derived from the mold-blade actuating lever can be increased, to conform to the requirements of the sorts caster or reduced to normal conditions incident to its use as a composer. Such an arrangement is shown in Figs. 19 and 20 wherein the actuating lever 26 (178 of Patent 625,998) for effecting the reciprocation of the mold-blade is provided with a short lever 27, one arm whereof engages the mold-blade connection 28, while the other is in position to be connected pivotally to a fixed bearing 29 on the frame, as by having its furcated end confined between a removable washer 30 engaging bearing 29 and the head of a screw 31 threaded into said bearing, so that as lever 26 is vibrated its motion will be transmitted to the mold-blade through lever 27, which latter, being of the third order, will increase the motion at its weight end. This is the condition established when the machine is equipped with a large mold and used as a sorts caster; and in order that normal conditions may be reëstablished it is only necessary to rigidly connect the supplemental or multiplying lever 27 to the actuating lever 26, which can be accomplished by the withdrawal of screw 31 from the fixed bearing, the insertion of the washer 30 between lever 27 and a bearing 32 on lever 26, and the clamping of these parts together by means of screw 31 extending through bearing 32 and engaging a threaded orifice in lever 27. Thus the same devices are available for converting the composing machine into a sorts caster and vice versa, and as all the parts are utilized in both adjustments loss of time incident to carelessness in misplacing detached elements is avoided.

The use of the larger mold of course necessitates the employment of a type carrier of larger capacity and it is proposed to equip the composing machines with a type carrier adapted to handle all sizes, the principal requirement being that the opening for the reception of the type be enlarged and the throw of the movable jaw and the type support correspondingly increased. Otherwise the type carrier does not differ essentially from those of Patents 625,998 and 674,375, except that the lever 20 for operating the type support is arranged on a horizontal instead of a vertical pivot, and is adapted to engage a removable stop or abutment 21 on the frame, and the stroke of the type carrier is slightly increased to compensate for the enlarged capacity of the mold which requires that the type opening in the carrier should alternately register with the mold cavity and the entrance to the discharge passage.

As a simple and ready means for effecting the adjustment of the throw of the type carrier and its position for use either as a composer or a sorts caster, its actuating lever 80 is equipped with a stud 81, provided with two pivot bearings 82, 83, the one slightly above and to one side of the other, as shown in Figs. 21 and 22, and the connecting rod 84 for the type carrier is furnished with a head 85 provided with two pivot-bearings 86, 87.

The normal connection for the composing machine is made by inserting the pivot pin 88 in bearings 82, 87, see Fig. 22; and when it is desired to use it as a sorts caster, the pin is withdrawn and the carrier shifted to bring bearings 83 and 86 in alinement, and the pin is inserted therein as shown in Fig. 21. The blocks at the entrance of the line channel forming part of the galley mechanism are also removed and two blocks 22, 23 (Figs. 11 and 12) forming a curved guide way opening upon the galley and fitted to the bearings for the removed blocks are substituted for the latter. The blocks 22, 23 are detachably secured to the seats of the line channel blocks by means of screws 75, the openings for which register with the threaded openings which receive the corresponding screws of the regular line channel blocks. One or both of said blocks 22, 23, is or are equipped with a spring retainer 24 for preventing the return or displacement of the type after it has been thrust from the holder by the ejector 25.

The equipment thus far described would be ample for the production of the large sized type desired, provided the metal injecting mechanism of the composing machine was competent to supply the requisite amount of metal, and the actuating devices for the centering plunger were adapted to firmly hold the matrix down on the mold against the increased pressure incident to the larger surface exposed; but they are not, hence auxiliary mechanism is supplied for reinforcing the action of these parts and which do not interfere with the normal operation of the machine as a composer. To increase the pressure on the matrix, when in closed position upon the mold an auxiliary compression device or member is detachably applied intermediate the centering plunger and its actuating lever, to reinforce the action of the normal compression spring 42.

In the preferred form illustrated in Fig. 8 the auxiliary compression device consists of two plates 34 each provided with a side opening 35 and a seat 36 for receiving either the head 37 against which actuating lever 38 bears, or a collar 39 on the centering plunger 11. Springs 40, one or more, are interposed between said plates 34, and the latter are connected by bolts 41 secured to one plate and extending through the springs and guides on the opposite plate, beyond which latter they are provided with nuts 42[a]. When used as a sorts caster the auxiliary compression device is slipped into place between head 37 and collar 39, so that when the centering plunger is seated the further motion of head 37 will compress the springs and thus add their tension to that of the normal compression spring in holding the matrix to its seat on the mold.

To render the pump mechanism effective it is required that the stroke of the piston be increased and at the same time be rendered more powerful, to accomplish which, without interfering with the timing of the machine, an auxiliary pump controller is applied in connection with the piston actuating devices, operating to lock or retard the movement of the piston during the initial motion of the actuator or driving member, and at a point beyond the compression spring, so that the latter will be compressed or placed under the tension, the energy thus stored being suddenly applied to the piston by the withdrawal of the locking or retarding devices. A preferred embodiment of this auxiliary pump controller adapted specially for use in connection with the pump mechanism of Patent 674,374, is illustrated in Figs. 2 to 7 inclusive.

It will suffice for present purposes to designate those elements of the prior structure with which the improvements are immediately connected, reference being had to the patent for a more detailed description thereof. These elements are the levers 43, 44 connected by link 45, one of said levers engaging the pump frame 46 and the other the piston rod 47; the head 48 secured to vertically movable rod 49 and connected to the power end of pump-frame lever 44; the head 50 provided with an off-set 51 engaging compression spring 52, the latter in turn engaging rod 53 attached to piston lever 43; and actuating rod 54 carrying head 50 and an arm 55, the latter engaging a spring 56 bearing against a collar on rod 49. The pump actuating mechanism operates upon rod 54 to elevate heads 48 and 50 and with them the pump and power ends of levers 43, 44, until, by the engagement of a stop 57 on rod 49, the head 48 and pump frame lever 44 are arrested, whereupon rod 54 continuing to rise, head 50 is separating from head 48 and its motion transmitted to the piston lever 43 through the compression spring 52. This is the normal action of the pump mechanism, and it is evident that the motions of rod 54 being uniform, as derived from the actuating mechanism, the throw of the piston can be varied by the adjustment of stop 57. Such adjustment is permissible but as it affects not only the seating of the nozzle and the time at which the pump begins to work, it is employed principally in connection with the initial adjusting and timing of the machine as a whole. In the present instance, however, advantage is taken of this feature for increasing the throw of the piston without interfering with the timing, other provisions being made therefor, as will presently appear, and this is accomplished by interposing a distance piece or gage 58 between the stop 57 and an abutment, such as the frame. In the example given the distance piece is pivotally attached to the frame and adapted to be swung into or out of engagement with said stop, being held in either position by a spring 59 attached to the frame so as to swing on opposite sides of the pivot.

To the head 48 is secured a rod 60 upon which is mounted a vertically movable sleeve 61 provided with an off-set or arm 62 riding upon rod 53 and occupying a position between arm 51 of head 50 and the piston lever 43. The sleeve 61 is provided with a retracting spring 63 and with shoulder 64, prefereably in the form of a hardened steel insert, in position to engage the lower or vertical arm of a latch 65, the latter pivotally attached to a collar 66 adjustably secured to the upper end of rod 60.

The pivot of latch 65 is located above and in line with shoulder 64, and when the sleeve 61 occupies its normal or retracted position the engaging arm of said latch stands above and in line with the upper face of said shoulder, being held in this position by a spring 67. This spring instead of acting directly upon the latch, as it might if the attachment was constantly in use, acts indirectly through a lever 68 supported upon the pivot pin of the latch and provided with an off-set 69 adapted to engage either of two separated bearings on the latch. The spring 67 has one end attached to one arm of lever 68, the opposite end being attached to collar 66 in such position that when the lever engages one of the bearings on latch 65 it will draw the arm of the latch 65 towards shoulder 64, on sleeve 61 (see Figs. 3 and 5) and when turned to engage the opposite bearing 70 it will swing across the pivot and draw the latch away from and out of contact with shoulder 64, thus disconnecting the tripping attachment. The latch 65 is also provided with a tripping member or arm 71 located in the path of and at a distance above a projection or shoulder 72 carried by head 51. The interval between tripping arm 71 and shoulder 72 determines the amount of travel permitted head 51 after head 48 has been arrested by gage 58 and the degree of compression applied to spring 52 before it is permitted to act upon the piston lever 43, for until latch 65 is engaged and moved out of contact with shoulder 64 the separation of levers 43, 44, at their power ends is prevented, although they are free to move in unison for effecting the elevation of the pump and the seating of the nozzle.

Assuming that the machine is equipped as a sorts caster with lever 68 and gage 58 in operating position ~~and actuating~~ rod 54 retracted so that heads 48 and 50 are in contact and resting against the supporting frame, the operation of this feature of the invention will be as follows: As actuating rod 54 rises the two heads 48, 50 move in unison until gage 58 arrests head 48 and with it the pump frame lever 44, together with piston lever 43, the latter being for the time locked to head 48 by the engagement of latch 65 with sleeve 61. Head 50 is however free to continue its motion, and in so doing compresses spring 52 until, by the engagement of its shoulder 72 with the tripping arm 71, the latch is finally withdrawn from shoulder 64 thereby unlocking the piston lever 43, whereupon the power stored in spring 52 is suddenly applied to the piston to force the molten metal into the mold.

When it is desired to restore the machine as a composer, the auxiliary pump controller can readily and quickly be thrown out of action by the withdrawal of gage 58 and a slight turn of lever 67, whereupon normal conditions, in so far as the pump actuating mechanism will be at once reëstablished.

Having thus described our invention, what we claim as new and desire to secure by Letters Patent, is:—

1. In a type casting machine such as described provided with a mold a type carrier and matrix case centering and metal injecting mechanism and in combination therewith, an auxiliary compression device for the centering plunger, a device for augmenting the motion desired from the actuator of the type carrier, and an auxiliary controller for the pump mechanism.

2. In a type casting machine such as described the combination with the centering and holding plunger for the matrix of an auxiliary compression device removably inserted between the actuating lever and the plunger and adapted to reinforce the action of the normal compression device.

3. In a type casting machine such as described, the combination with the matrix centering and holding plunger its actuating device or lever and interposed compression spring, of an auxiliary compression device comprising end plates, and separating spring or springs, said end plates being provided with open bearings for engaging the actuating device and a collar on the plunger.

4. The combination to form an auxiliary compression device for the matrix centering and holding plunger of two plates each provided with a lateral opening communicating with a seat for the reception of a collar on the plunger or the actuating device therefor, tie rods connecting said plate on opposite sides of said bearings, and a plurality of tension springs located intermediate the plates.

5. In a type casting machine, such as described and in combination with the die-case thereof and its centering mechanism, of a matrix holder fitted to said die-case and provided with a seat for the centering plunger and gages for positioning the matrix in justified relation to said seat.

6. In a type casting machine such as described the combination, to form a matrix holder therefor, of a block or frame fitted to the die-case and provided with a seat for the centering plunger, two gages at right angles for receiving the edges of the matrix, to locate the latter and adjustable clamps engaging the edges of the matrix, to hold the latter to the gages.

7. A matrix holder for the die-case of a type casting machine such as described, the same consisting of a block or frame adapted to the opening in the die-case and provided with a seat for the centering plunger two fixed gages for the matrix, and adjustable edge clamps in the form of angular blocks seating on said block or frame and engaged by diagonally disposed screw, to clamp the matrix against said gages.

8. In a type casting machine such as described, the combination with the actuating device or lever for the mold-blade, of an auxiliary lever carried by said actuating device and having one arm coupled with the mold-blade, and means whereby said auxiliary lever may be coupled with either a fixed abutment or the actuating device.

9. In a type casting machine such as described and in combination with the mold-blade and the actuating device or lever thereof, of an auxiliary lever pivotally supported upon said actuator with one arm coupled to the mold-blade and the other to a fixed abutment.

10. In a type casting machine such as described and in combination with the mold-blade and its actuating device or lever of an auxiliary lever pivotally supported upon said actuating device and having one arm coupled with the mold-blade, and means for detachably connecting said auxiliary lever to a fixed support or to the actuating device, interchangeably, the same comprising a screw and collar, the latter gaging the position of the auxiliary lever both with respect to the fixed support and the actuating device accordingly as the screw is applied to one or the other.

11. In a type casting machine such as described and in combination with the mold and type carrier thereof, the blocks forming a delivery channel adapted to fit the seats of the line channel blocks and detachably secured thereto.

12. In a type casting machine such as described and in combination with the pump actuating mechanism thereof, an auxiliary controller mechanism adapted to lock or restrain the piston and increase the pressure on the compression spring coupled therewith during a part of the traverse of the actuating device and subsequently release the piston to the action of the compression spring.

13. In a pump operating mechanism for type machines wherein the actuating device is coupled with the piston through a compression spring to effect the injecting stroke of the piston, and in combination therewith, an auxiliary control device, including a lock for the piston and a trip operated by the movement of the actuating device to release the piston at a predetermined point in the traverse of the actuating device.

14. In a pump actuating mechanism for type machines, the combination of the following elements, to wit: an actuator connected to the piston through a compression spring; a lock for restraining the movement of said piston while the actuator advances to increase the pressure of the spring; and a tripping device operated by the actuator to release the piston after a preliminary transverse of said actuator.

15. In a pump actuating mechanism for type machines such as described the combination with the piston lever, its rod and compression spring and the actuator engaging the latter to advance the piston, of a device engaging the piston lever, a latch engaging said device for locking the piston lever against the action of its compression spring. and a tripping device connected to said latch and projecting into the path of the actuator or a part moving in unison therewith.

16. In a pump actuating mechanism for type machines the combination with the piston lever, actuator, and intermediate spring, of a lock for the piston lever provided with a latch and a tripping member, the latter located in the path of the actuator, and means for holding said latch in operative or inoperative positions, at will.

17. In pump actuating mechanism for type machines such as described, provided with connected pump-frame and piston levers, two heads the one coupled to the pump-frame lever and the other to the piston lever through a rod and compression spring, a yielding connection between the two heads through which motion transmitted to the one coupled with the piston lever is communicated to the other, and means for limiting the movement of the head coupled with the pump-frame lever, and in combination with said limiting means a movable gage block for changing the throw of the pump-frame lever.

18. In a pump actuating mechanism for type machines such as described provided with connected pump-frame and piston levers, a movable head coupled with the pump-frame lever, a second movable head coupled with the piston lever through a rod and compression spring, a yielding connection between said heads through which motion communicated to the piston lever head is communicated to the pump-frame head, and means for limiting the motion of said pump-frame head, and in combination therewith a gage for restricting the movement of the pump-frame head, a latch for restraining the piston lever and a trip coupled with said latch and engaged by a member controlled by the piston head for effecting the release of the piston lever.

19. In a pump actuating mechanism for type machines such as described the combination with the connected piston and pump-frame levers, the two movable heads, and the rod and compression spring coupling the piston lever to its head, of a rod secured to the pump-frame head, a sleeve movable on said rod and provided with an arm engaging the piston lever, a latch pivotally supported upon said rod in position to engage a shoulder on the sleeve and provided with a tripping arm extending into the path of the piston lever head, and means for reciprocating said heads in different degrees to compress the pump spring and release the latch.

20. In a type casting machine such as described and in combination with the type carrier thereof, an actuator, and transmitting means including a shiftable connection for varying the relation of the type carrier to its actuator and the extent of motion communicated by the latter.

21. In a type casting machine such as described, the combination with the type carrier and its actuating lever, of a connection coupled with said lever and provided with a plurality of bearings, a connection coupled with the type carrier, also provided with a plurality of bearings, and means for coupling the bearings of said connections, to vary the position and degree of motion of the type carrier.

22. A type casting machine provided with means for varying the throw of the mold-blade and type carrier to adapt it for use as a sorts caster.

23. In a type casting machine, the combination with a mold provided with a movable mold-blade and a movable type carrier, of means for varying the throw of the mold blade and of the type carrier.

24. In a type casting machine the combination with the pump its piston driving mechanism to which uniform motion is communicated, and a spring interposed between said driving mechanism and the piston, of means for varying the effective action of said spring during the movement of the driving mechanism.

JOHN SELLERS BANCROFT.
MAURITZ C. INDAHL.

Witnesses:
MORTIMER A. JONES,
W. ARTHUR SELLMAN.